(12) United States Patent
Tiikkainen (10) Patent No.: US 11,770,237 B2
(45) Date of Patent: Sep. 26, 2023

(54) HARDWARE ACCELERATOR FOR FEISTEL BLOCK CIPHERS

(71) Applicant: Nordic Semiconductor ASA, Trondheim (NO)

(72) Inventor: Matti Tiikkainen, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 427 days.

(21) Appl. No.: 17/251,495

(22) PCT Filed: Jun. 12, 2019

(86) PCT No.: PCT/EP2019/065413
§ 371 (c)(1),
(2) Date: Dec. 11, 2020

(87) PCT Pub. No.: WO2019/238790
PCT Pub. Date: Dec. 19, 2019

(65) Prior Publication Data
US 2021/0160055 A1     May 27, 2021

(30) Foreign Application Priority Data

Jun. 13, 2018 (GB) .................................... 1809704

(51) Int. Cl.
*H04L 29/06* (2006.01)
*H04L 9/06* (2006.01)

(52) U.S. Cl.
CPC .......... *H04L 9/0625* (2013.01); *H04L 9/0637* (2013.01); *H04L 2209/122* (2013.01)

(58) Field of Classification Search
None
See application file for complete search history.

(56) References Cited

U.S. PATENT DOCUMENTS

2004/0148512 A1   7/2004  Park et al.
2006/0023877 A1   2/2006  Tsuruga

FOREIGN PATENT DOCUMENTS

EP   3182637 A1 *  6/2017  ......... H04L 63/0428
GB   1480858 A     7/1977

OTHER PUBLICATIONS

Arnaud Lagger: "Implementation of DES Algorithm Using FPGA Technology", Jan. 1, 2003 (Jan. 1, 2003), XP055615993, Retrieved from the Internet: URL:http://www.alagger.com/des-vhdl/report.pdf (Year: 2003).*

(Continued)

*Primary Examiner* — Andrew J Steinle
(74) *Attorney, Agent, or Firm* — Klarquist Sparkman, LLP (57) ABSTRACT

A hardware accelerator is arranged to perform cipher operations and comprises a first memory area arranged to store a first bit string and a second memory area arranged to store a second bit string. A calculation block is arranged to receive a round key and to perform a function on the first bit string. The function comprises combining the first bit string with the round key to produce a combined bit string and performing a non-linear mapping from the combined bit string to a mapped bit string. An addition block is arranged to add the mapped bit string to the second bit string to produce a resultant bit string. A controller is arranged to receive a control signal and, depending on the state of the control signal, provides the first bit string and the resultant bit string to the appropriate memory area.

14 Claims, 8 Drawing Sheets

(56) References Cited

OTHER PUBLICATIONS

Anonymous: "Cryptography | DES implementation in C", Techie Delight, Jun. 23, 2017 (Jun. 23, 2017), XP055615971, Retrieved from the Internet: URL:https://www.techiedelight.com/des-implementation-c/ (Year: 2017).*
"Cryptograph | DES Implementation in C—Techie Delight," downloaded from https://www.techiedelight.com/des-implementation-c/ on Mar. 17, 2020, 20 pages.
International Search Report and Written Opinion for PCT/EP2019/065413, dated Oct. 31, 2019.
IPO Search Report under Section 17(5) for GB 1809704.8, dated Nov. 21, 2018, 4 pages.
IPO Search Report under Section 17(6) for GB 1809704.8, claims 19-23, dated Dec. 20, 2019, 2 pages.
IPO Search Report under Section 17(6) for GB1809704.8, claims 13-18, dated Dec. 20, 2019, 2 pages.
Lagger, "Implementation of DES Algorithm Using FPGA Technology," Jan. 1, 2003, 78 pages.

\* cited by examiner

HARDWARE ACCELERATOR FOR FEISTEL BLOCK CIPHERS

CROSS REFERENCE TO RELATED APPLICATIONS

This is the U.S. National Stage of International Application No. PCT/EP2019/065413, filed Jun. 12, 2019, which was published in English under PCT Article 21(2), which in turn claims the benefit of Great Britain Application No. 1809704.8, filed Jun. 13, 2018.

TECHNICAL FIELD

The present invention relates to hardware accelerators, specifically hardware accelerators for implementing ciphering algorithms used in cryptography.

BACKGROUND

It is a common aim in communications to encrypt a message prior to its transmission in order to prevent unauthorised parties from accessing the contents of the message even if it is intercepted. In general, the message that is to be encrypted (the 'plaintext') is passed through an encryption algorithm (or 'cipher') which generates the encrypted message (the 'ciphertext').

There are many well-documented ciphers that are known in the art per se. One such cipher algorithm is the Data Encryption Standard (DES), which was used for many years but is now considered insecure due to its relatively short key length of 56 bits. An enhancement to DES that is commonly used in modern encrypted communications is triple DES (3DES), in which the DES algorithm is run thrice with three independent keys.

The 3DES standard specifies first encrypting the plaintext (which, according to the standard, is a 64-bit block) with a first key $k_1$, then decrypting the result of that encryption with a second key $k_2$, then finally encrypting the result of that decryption using a third key $k_3$. Those skilled in the art will appreciate that each of these encryption and decryption steps follows the DES algorithm. The result of this is that security is greatly enhanced, due to the 168 independent key bits.

Simply encrypting the plaintext twice with two different keys (2DES) does not provide a great enhancement to security due to a vulnerability to meet-in-the-middle attacks, which renders the effective security of 2DES to be only 57 bits. While 3DES is also vulnerable to meet-in-the-middle attacks, these require $2^{2\times56}$ steps and so the effective security of 3DES is 112 bits, which is sufficient for many applications.

The Applicant has appreciated, however, that running three invocations of the DES algorithm in order to carry out 3DES encryption can be relatively slow and require a relatively large amount of power due to the number of operations that are required in order to perform the encryption.

SUMMARY OF THE INVENTION

When viewed from a first aspect, the present invention provides a hardware accelerator for performing cipher operations to convert between a plaintext message and a ciphertext message, the hardware accelerator comprising:

a first memory area arranged to store a first bit string provided at an input thereto;
a second memory area arranged to store a second bit string provided at an input thereto;
a calculation block arranged to receive a round key and to perform a function on the first bit string, wherein the function comprises combining the first bit string with the round key to produce a combined bit string, and performing a non-linear mapping from the combined bit string to a mapped bit string;
an addition block arranged to add the mapped bit string to the second bit string to produce a resultant bit string; and
a controller arranged to receive a control signal, wherein the controller is further arranged such that:
when the control signal is in a first state, the controller provides the resultant bit string to the input of the first memory area and provides the first bit string to the input of the second memory area; and
when the control signal is in a second state, the controller provides the first bit string to the input of the first memory area and provides the resultant bit string to the input of the second memory area.

This first aspect of the invention extends to a method of operating a hardware accelerator for performing cipher operations to convert between a plaintext message and a ciphertext message, the hardware accelerator comprising first and second memory areas, wherein the method comprises:

storing a first bit string in the first memory area, wherein the first bit string is provided at an input to said first memory area;
storing a second bit string in the second memory area, wherein the second bit string is provided at an input to said second memory area;
receiving a round key;
performing a function on the first bit string, wherein the function comprises combining the first bit string with the round key to produce a combined bit string, and performing a non-linear mapping from the combined bit string to a mapped bit string;
adding the mapped bit string to the second bit string to produce a resultant bit string; and
receiving a control signal;
when the control signal is in a first state, providing the resultant bit string to the input of the first memory area and providing the first bit string to the input of the second memory area; and
when the control signal is in a second state, providing the first bit string to the input of the first memory area and providing the resultant bit string to the input of the second memory area.

Thus it will be appreciated by those skilled in the art that, at least in embodiments thereof, the present invention provides a hardware accelerator that performs data handling operations internally, i.e. independently from software, which reduces the execution time of the algorithm, thereby increasing the speed of the encryption algorithm.

A hardware accelerator in accordance with the claimed invention may be used to carry out Feistel ciphers without requiring external data handling. Those skilled in the art will appreciate that the term 'Feistel ciphers' as used herein relates to block ciphers that follow the Feistel scheme, in which data flows along a 'criss-cross' path between subsequent rounds such that the bit string subjected to the non-linear function during the previous round is added (in its previous form, i.e. prior to the non-linear function) to the output of the non-function in the current round, which takes as its input the output from the previous round's addition.

Each of these Feistel rounds is carried out by setting the control signal to the first state.

After the required number of Feistel rounds have been carried out, the control signal may, in some embodiments, be set to the second state. This performs a final Feistel round but does not carry out the criss-cross operation such that the 'left-hand' sub-block remains on the 'left' and the 'right-hand' sub-block remains on the 'right'. It will of course be appreciated that the terms 'left' and 'right' here are conceptual and are not limiting on the relative storage locations of the relevant data in memory physically.

In general, block ciphers require a non-linear component in order to prevent the cipher being trivially breakable through cryptanalysis. While there are a number of ways of providing this non-linearity known in the art per se, for example a substitution-permutation network, the Applicant has appreciated that the principles of the claimed invention are particularly applicable to Feistel function-based ciphers. Therefore, in some embodiments, the function carried out by the calculation block comprises a Feistel function.

As will be appreciated by those skilled in the art, the Feistel function (sometimes referred to as the 'F-function' in the art) involves feeding a bit string to an expansion block. In DES, this involves expanding the 32-bit sub-block to an expanded 48-bit sub-block by splitting the 32-bit sub-block into sequential 4-bit groups and copying the immediate left and immediate right bits from the previous and next 4-bit groups (i.e. the last bit of the previous 4-bit group and the first bit of the next 4-bit group, where the groups 'wrap' such that the first 4-bit group is 'next to' to last 4-bit group) to form a 6-bit group, thus expanding the sub-block to eight 6-bit groups and resulting in the expanded 48-bit sub-block.

The expanded sub-block is then added to the round key (which in DES operations is a 48-bit key derived from the 56-bit encryption key). The result of this addition is then fed into a number of substitution boxes (or 'S-boxes'). Each S-box takes a set of bits from the bit string (mixed with the round key) and replaces those bits with a different set of bits according to a non-linear transformation (which provides the non-linear mapping), typically by use of a lookup table—in DES this takes each 6-bit group from the expansion block and generates a particular 4-bit output according to the lookup table of that S-box. Each S-box typically has a different lookup table, where these lookup tables are well documented in the art.

The outputs of these S-boxes are then input to a permutation box (or 'P-box') which shuffles the bits into a different order such that the outputs from each S-box will be distributed across the inputs of different S-boxes in the next Feistel round. This alternation of S-boxes and P-boxes provides the confusion and diffusion characteristics that are desirable for a secure cipher.

In some embodiments, the hardware accelerator further comprises an initial permutation block arranged to perform an initial permutation operation on an input bit string and to generate therefrom first and second initial bit strings, wherein the controller is further arranged such that when the control signal is in a third state, the controller provides the first initial bit string to the input of the first memory area and provides the second initial bit string to the input of the second memory area. It will be appreciated that by setting the control signal to the third state, the initial data may be loaded via the initial permutation block, which is required by some ciphers such as DES.

A given DES invocation may therefore be achieved by setting the control signal to the third state for the first round (to load in data from the initial permutation block and perform the first Feistel round), then to the first state for fourteen further rounds, and then to the second state for the final round.

The functionality of the controller is described hereinabove, and different structural arrangements may be used to achieve the functionality described. However, in some embodiments, the controller comprises a first multiplexer and a second multiplexer each comprising a respective first data input, second data input, control input, and data output, said controller being arranged such that:

the first data input of the first multiplexer and the second data input of the second multiplexer are each connected to an output of the addition block;

the second data input of the first multiplexer and the first data input of the second multiplexer are each connected to an output of the first memory area;

the data output of the first multiplexer is connected to the input of the first memory area, and the data output of the second multiplexer is connected to the input of the second memory area; and the respective control inputs of the first and second multiplexers are each arranged to receive the control signal;

wherein each of the first and second multiplexers is arranged to route its respective first data input to its respective data output when the control signal is in the first state; and wherein each of the first and second multiplexers is arranged to route its respective second data input to its respective data output when the control signal is in the second state.

In a set of embodiments in which the hardware accelerator comprises an initial permutation block as outlined above, each of the first and second multiplexers comprises a respective third data input connected to the initial permutation block, wherein:

the third data input of the first multiplexer is arranged to receive the first initial bit string from the initial permutation block;

the third data input of the second multiplexer is arranged to receive the second initial bit string from the initial permutation block; and each of the first and second multiplexers is arranged to route its respective third data input to its respective data output when the control signal is in the third state.

The Applicant has appreciated that a hardware accelerator in accordance with embodiments of the claimed invention is particularly advantageous for carrying out operations where a given cipher algorithm is invoked multiple times, with the output from one invocation being the input to the following invocation, for example 3DES. Thus, at least in some embodiments, the method further comprises:

a) dividing the plaintext message into first and second sub-blocks;

b) providing the first and second sub-blocks as the first and second bit strings respectively;

c) setting the control signal to the first state for a predetermined number of cycles, wherein a new round key, derived from an encryption key, is supplied for each cycle;

d) supplying a further new round key, derived from the encryption key, and setting the control signal to the second state after the predetermined number of cycles have been carried out; and repeating steps c) and d) for a plurality of encryption keys.

In order to carry out 3DES, for the first encryption key the control signal may be set to the third state for the first round, and then to the first state for fourteen further rounds, and then to the second state for the final round. For the second and third encryption keys, the control signal may be set to the first state for the first fifteen rounds, and then to the second state for the final round, without needing to perform the initial load from the initial permutation block because the data is already in memory from the previous invocation of the DES algorithm.

In some such embodiments, the hardware accelerator further comprises a final permutation block arranged to perform an inverse of the initial permutation operation. This final permutation block therefore reverses the permutation operation carried out by the initial permutation block. It will be appreciated that the initial and final permutation operations typically do not have cryptographic significance but are used by certain cipher standards.

Therefore, when operating a hardware accelerator in accordance with some embodiments of the claimed invention, it may be advantageous to set the control signal to the third state before setting the control signal to the first state. In other words, the method may comprise setting the control signal to the third state before carrying out step c). In some such embodiments, the method further comprises performing the inverse of the initial permutation after step d). While these initial and final permutation steps could be carried out for each invocation of the cipher algorithm, the Applicant has appreciated that this is not necessary because the initial and final permutation steps are simply inverses of one another and so, at least in some preferred embodiments, the control signal is set to the third state only before the first repetition of step c), and preferably the inverse of the initial permutation is carried out only after the final repetition of step d). This may advantageously reduce the number of processing steps required in order to carry out cipher algorithms such as 3DES that invoke the same underlying cipher (i.e. the DES cipher) multiple times, as the initial and final permutations may simply be done once, at the beginning and the end of the process respectively.

Advantageously, the hardware accelerator may be arranged such that the bit strings stored in memory at the end of a given invocation of the encryption algorithm can remain in the memory ready for the next invocation of the encryption algorithm. By not taking the data out of the memory, fewer processing steps are required in order to run the algorithm multiple times, resulting in faster execution of encryption schemes that require multiple invocations of the same algorithm. This reduction in processing steps may also advantageously result in a reduction in power consumption, which is particularly desirable for battery-powered devices where battery life is an important design consideration.

While the principles of the present invention may readily be applied to a wide variety of different ciphers known in the art per se, the Applicant has appreciated that the hardware accelerator described herein is particularly advantageous for use with the data encryption standard (DES) cipher and so, at least in some embodiments, the hardware accelerator is arranged to perform DES operations, particularly operations wherein the DES algorithm is invoked multiple times in a row such as when carrying out 3DES.

It will be appreciated that each memory area may be either a physical or a logical area in memory. In other words, one or more of the memory areas may not necessarily be a physically continuous area in memory, but may comprise multiple physical memory locations having a logical relationship therebetween such that they can be treated as an 'area' regardless of any physical separation.

It will be appreciated therefore that the first and/or second memory areas may be constructed from multiple registers, or could be constructed from the same register, but divided into separate areas. In some embodiments, however, the first and second memory areas comprise first and second registers respectively. For example, for DES-based implementations such as 3DES, it may be advantageous for the first and second memory areas each to comprise a separate, 32-bit register (or a register wider than 32 bits) such that each memory area has a single register that can store an entire sub-block.

Typically, a block cipher may be run in different modes. One such mode is the 'electronic codebook' (ECB) mode, in which each plaintext or ciphertext message is run through the cipher individually and is wholly independent of any other plaintext or ciphertext message as appropriate. The ECB mode, however, has the disadvantage that it does not provide particularly good diffusion properties. An alternative mode with better diffusion properties is 'cipher block chaining' (CBC) in which each block of plaintext undergoes a XOR operation together with the previous ciphertext block, wherein an initialisation vector (IV) is used for the first block to ensure each message is unique. However, while under the ECB mode the cipher is fully symmetric such that the same operation is used for both encryption and decryption, with CBC an extra layer of data handling is required depending on whether encryption or decryption is being performed due to the dependence on neighbouring blocks.

The Applicant has devised a particularly advantageous support structure for configuring a block cipher to run in the ECB and CBC modes and to switch between these. Thus, when viewed from a second aspect, the present invention provides an electronic device comprising:

a cipher module arranged to perform cipher operations to convert between a plaintext message and a ciphertext message, said cipher module comprising an input and an output and being arranged to receive a round key; and a cipher support structure connected to the input and output of the cipher module, said cipher support structure comprising:

an input arranged to receive an incoming bit string;
an output arranged to provide an outgoing bit string;
a buffer arranged to store a stored bit string;
a switching arrangement arranged such that:
  in a first mode of operation, the input of the cipher support structure is connected to the input of the cipher module such that the incoming bit string is provided to the input of the cipher module, and the output of the cipher module is provided as the outgoing bit string; and
  in a second mode of operation, the incoming bit string is added to the stored bit string to produce a combined bit string, wherein the combined bit string is provided to the input of the cipher module, the stored bit string is set to the output of the cipher, and wherein the output of the cipher module is provided as the outgoing bit string.

Those skilled in the art will appreciate that the first mode of operation operates the cipher in the ECB mode (for encryption or decryption) while the second mode of operation operates the cipher in the CBC mode (for encryption only).

As outlined above, embodiments of the second aspect of the invention can perform encryption in the CBC mode. In some embodiments, the switching arrangement is further arranged such that: in a third mode of operation, the input of the cipher support structure is connected to the input of the cipher module such that the incoming bit string is provided to the input of the cipher module, wherein the output of the cipher is added to the stored bit string to produce a further combined bit string, wherein the further combined bit string is provided to the output of the cipher support structure such that outgoing bit string is set to the stored bit string. Those skilled in the art will appreciate that this provides the cipher support structure with the ability to operate the cipher in the CBC mode for decryption.

The ability to switch between CBC encryption and decryption modes is novel and inventive in its own right and thus, when viewed from a third aspect, the present invention provides an electronic device comprising:

a cipher module arranged to perform cipher operations to convert between a plaintext message and a ciphertext message, said cipher module comprising an input and an output and being arranged to receive a round key; and a cipher support structure connected to the input and output of the cipher module, said cipher support structure comprising:

an input arranged to receive an incoming bit string;
an output arranged to provide an outgoing bit string;
a buffer arranged to store a stored bit string;
a switching arrangement arranged such that:
in a first mode of operation, the incoming bit string is added to the stored bit string to produce a combined bit string, wherein the combined bit string is provided to the input of the cipher module, wherein the stored bit string is set to the output of the cipher, and wherein the output of the cipher module is provided as the outgoing bit string; and
in a second of operation, the input of the cipher support structure is connected to the input of the cipher module such that the incoming bit string is provided to the input of the cipher module, wherein the output of the cipher is added to the stored bit string to produce a further combined bit string, and the further combined bit string is provided to the output of the cipher support structure such that the outgoing bit string is set to the further combined bit string.

It will be appreciated that the cipher support structure of the electronic devices of the second and third aspects of the invention may readily be connected to any suitable cipher module. However, in some embodiments of either of the second and third aspects of the invention, the cipher module comprises a hardware accelerator for performing cipher operations to convert between a plaintext message and a ciphertext message. This hardware accelerator may comprise a hardware accelerator according to the first aspect of the invention and may include any of the optional technical features described hereinabove in relation to the first aspect of the invention.

In some embodiments, the switching arrangement comprises one or more multiplexers responsive to a mode control signal, wherein the one or more multiplexers make and break electrical connections in order to route signals to and from the inputs and outputs of the cipher module and cipher support structure as appropriate.

In some embodiments the input of the cipher support structure comprises an input buffer. Those skilled in the art will appreciate that the input buffer may provide a means for temporarily storing the incoming bit string.

In some embodiments, the cipher support structure further comprises a key scheduler arranged to produce a plurality of round keys from an encryption key and to supply the round key used by the cipher module from said plurality of round keys. It will be appreciated by those skilled in the art that the round keys may be derived from the encryption key in a manner known in the art per se and may be pre-calculated as a batch or may be calculated on-the-fly during operation.

BRIEF DESCRIPTION OF DRAWINGS

Certain embodiments of the invention will now be described, by way of example only, with reference to the accompanying drawings in which.

DETAILED DESCRIPTION

Figure 1:
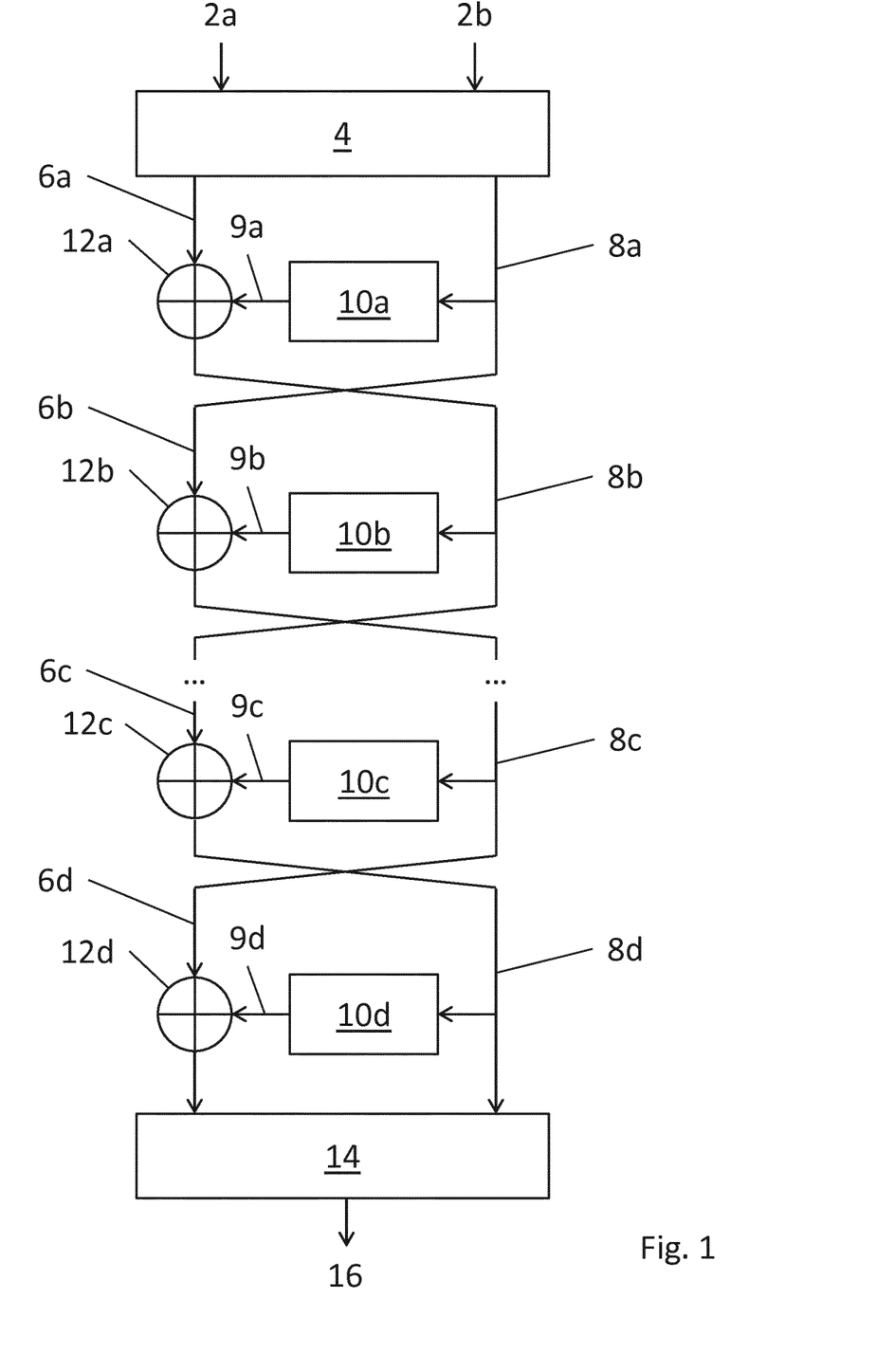
FIG. 1 is a schematic diagram of the prior art DES algorithm.

FIG. 1 is a schematic diagram of the prior art DES algorithm. As outlined above, the DES cipher algorithm operates to encipher a plaintext block of 64 bits. This 64-bit block, i.e. the plaintext, is first divided into two 32-bit sub-blocks 2a, 2b. These sub-blocks 2a, 2b are fed into an initial permutation 4 which performs a permutation function on the block, re-arranging the bits into a particular order for onward processing. This initial permutation 4 (together with the final permutation 14 described later) are a well-documented part of the DES algorithm that are required by the standard but do not have any cryptographic importance.

The resulting sub-blocks 6a, 8a following this initial permutation 4 are then passed into the first of a series of sixteen Feistel rounds. Each Feistel round comprises a Feistel function block 10a-d and an XOR block 12a-d. For ease of illustration, only four Feistel rounds are shown, however there are sixteen of them in practice, as denoted by the ' . . . ' shown between the first two and the last two rounds that are depicted.

As can be seen from FIG. 1, a 'criss-cross' arrangement is used between successive Feistel rounds. Firstly, the left-most sub-block 6a is input directly into the first XOR block 12a. The right-most sub-block 8a is input to the first Feistel function block 10a, which performs the Feistel function described below with reference to FIG. 2 and to the second XOR block 12b. The output 9a of this first Feistel function block 10a is also input to the first XOR block 12a, and this XOR block 12a performs a bit-wise logic XOR (i.e. exclusive OR) function on the left-most sub-block 6a and the output 9a of the Feistel function block 10a (i.e. on the right-most sub-block 8a after having been subjected to the Feistel function).

For the next Feistel round, a similar operation takes place, but this time with the left and right inputs swapped around. The output of the first XOR block 12a is used as the input 8*b* to the second Feistel function block 10*b* and the third XOR block (not shown) while the right-most sub-block 8*a* from the first round (i.e. the original sub-block 8*a*, not the version after subjection to the Feistel function) is used as the input 6*b* to the second XOR block 12*b*.

The second Feistel function block 10*b* performs the Feistel function on its input 8*b*, i.e. on the output of the first XOR block 12*a* from the previous Feistel round. The output 9*b* of the second Feistel function block 10*b* is input to the second XOR block 12*b*, which performs a bit-wise logic XOR function on its two inputs 6*b*, 9*b*.

This criss-cross pattern continues for fourteen further rounds, where the output from the XOR block 12*a-d* in one round is passed to the input of the Feistel function block 10*a-d* of the next round and to the input of the XOR block 12*a-d* of the round after next.

After sixteen such Feistel rounds, the output of the final XOR block 12*d* and the input to the final Feistel function block 10*d* are both input to a final permutation block 14 which performs the inverse of the permutation operation applied by the initial permutation block 4, re-assembling the two sub-blocks into a new, 64-bit block 16, where this block 16 is the ciphertext.

Figure 2:
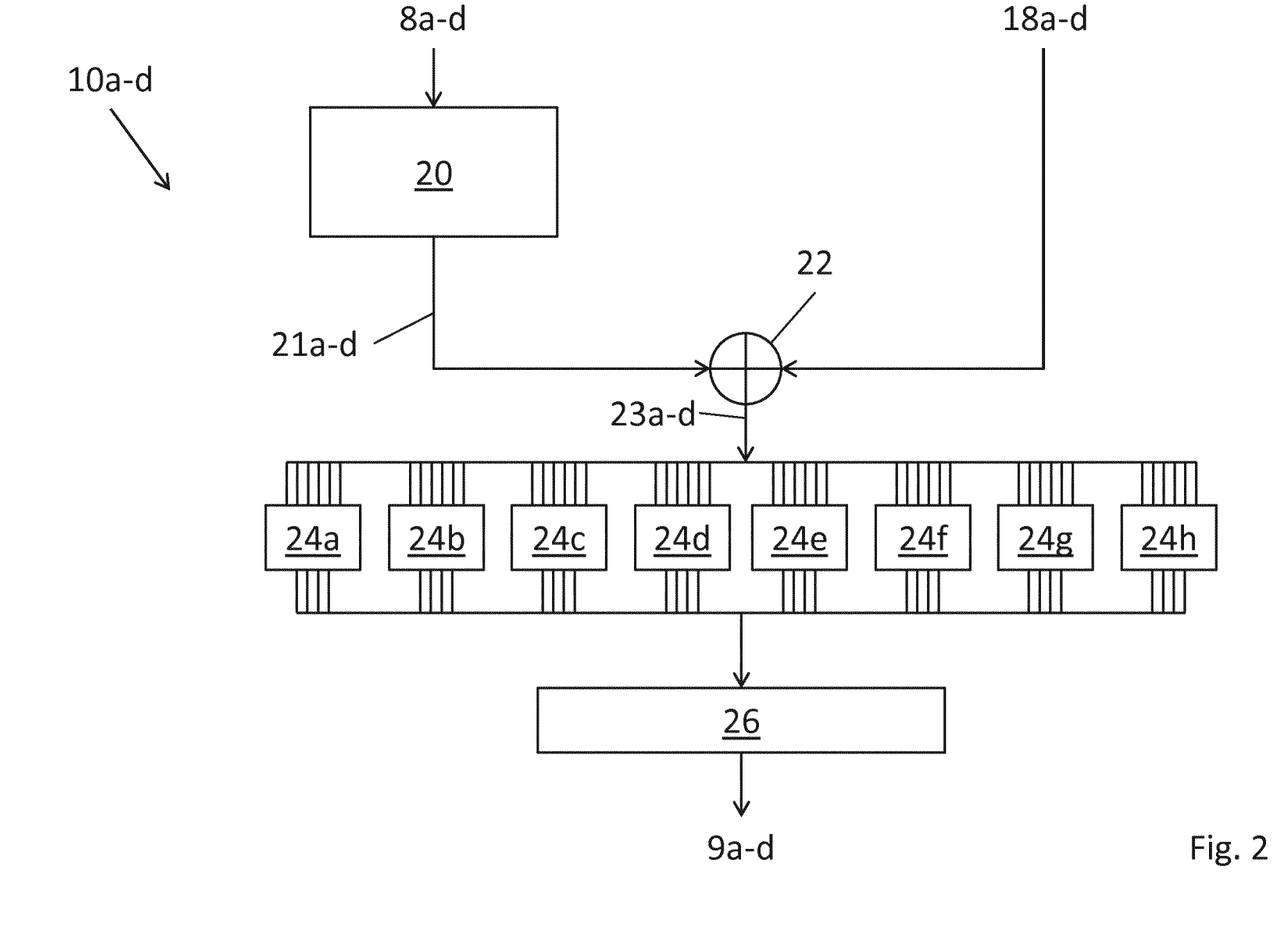
FIG. 2 is a schematic diagram of the prior art Feistel function used in the DES algorithm of FIG. 1.

FIG. 2 is a schematic diagram of the prior art Feistel function used in the DES algorithm of FIG. 1. As outlined above, each Feistel round makes use of a Feistel function block 10*a-d* which operates on a particular sub-block provided at its respective input 8*a-d*. The Feistel function block 10*a-d* also takes a 48-bit sub-key 18*a-d* as an input. These sub-keys 18*a-d* are generated from a particular 56-bit DES key by a key schedule algorithm, which is also well documented in the art but described briefly with reference to FIG. 8 later.

For a given Feistel function block 10*a-d*, the respective input sub-block 8*a-d* is first input to an expansion block 20 which expands the 32-bit input sub-block 8*a-d* to a 48-bit sub-block by taking successive groups of four bits and duplicating the bit to the immediate left and the bit to the immediate right of those four bits to make a new group of six bits, resulting in a respective expanded sub-block 21*a-d*.

The expanded sub-block 21*a-d* is input to a XOR block 22 together with the corresponding sub-key 18*a-d*, and the XOR block 22 performs a logic XOR operation in order to produce a respective new 48-bit sub-block 23*a-d* which obscures the underlying data due to application of the sub-key 18*a-d*. This sub-block 23*a-d* is then input to a series of eight substitution boxes (commonly referred to as 'S-boxes') 24*a-h*, which each take six bits of the 48-bit sub-block 23*a-d* and perform a one-to-one mapping (typically using a look-up table) to provide a four-bit output. These S-boxes provide a non-linear transformation from the input to the output and provide the core of the security of the DES algorithm.

The outputs of these eight S-boxes 24*a-h* are then input to a permutation box 26 (commonly referred to as a 'P-box' in the art), which performs a permutation on the bits produced by the S-boxes 24*a*—to provide the respective outputs 9*a-d* by swapping the positions of the bits around in such a way that the four bits output from each S-box 24*a-h* in one Feistel round are generally spread across four different S-boxes 24*a-h* in the next Feistel round. The alternation of S-boxes 24*a-h* and P-boxes 26 (together with the expansion provided by the expansion block 20) provide confusion and diffusion respectively.

Figure 3:
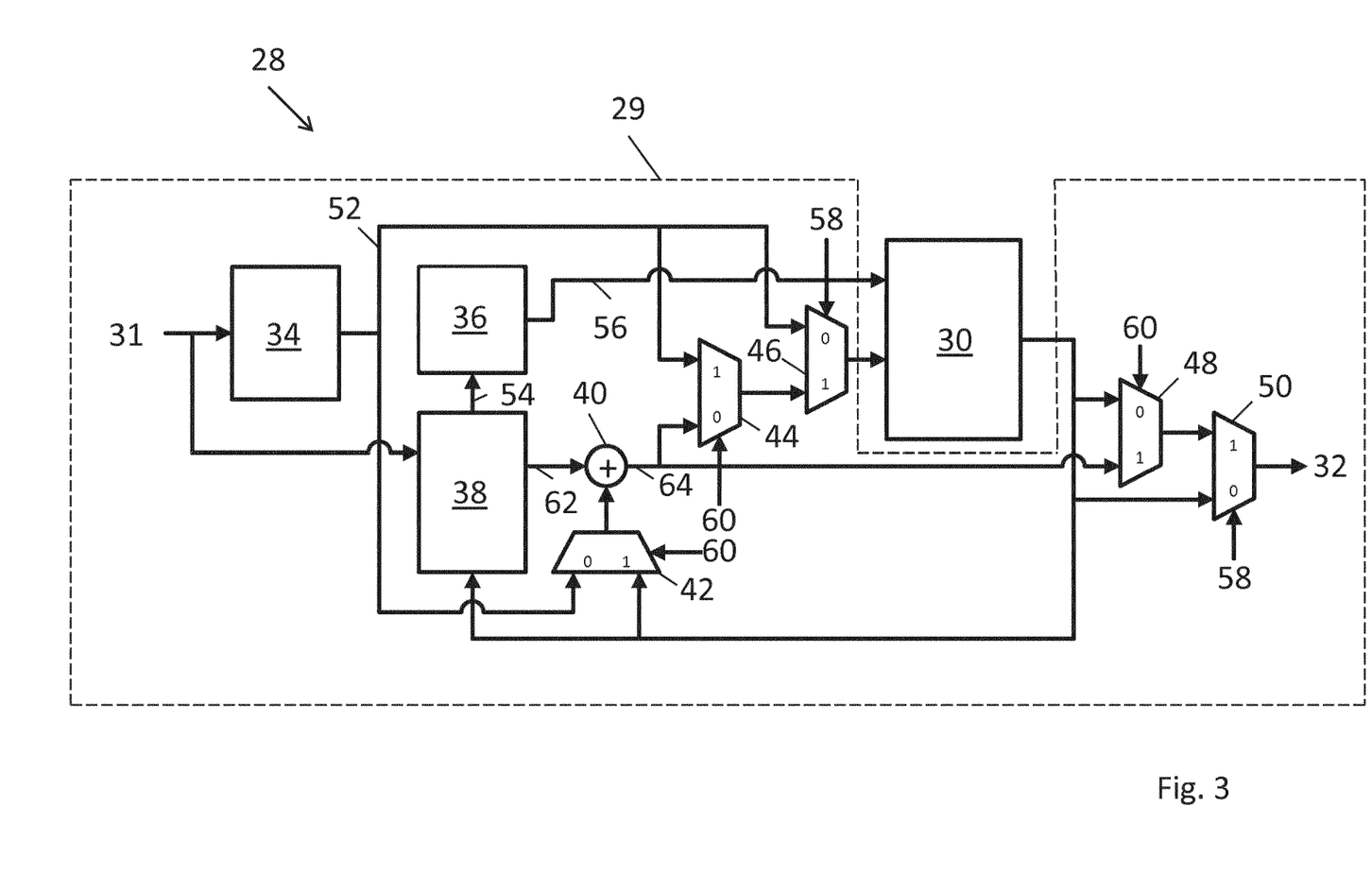
FIG. 3 is a schematic diagram of an electronic device including a cipher support structure and a hardware acceleration module in accordance with an embodiment of the present invention.

FIG. 3 is a schematic diagram of an electronic device 28 including a cipher support structure 29 and a hardware acceleration module 30 in accordance with an embodiment of the present invention. It will be appreciated that the cipher support structure 29 and a hardware acceleration module 30 may be (but are not necessarily) provided on the same electronic circuit, but are divided here logically for ease of explanation.

The cipher support structure 29 is arranged to receive an incoming bit string 31 and produce an outgoing bit string 32 via the cipher module 30, where the incoming bit string 31 may be either a plaintext or a ciphertext, and the outgoing bit string 32 is then the ciphertext or the plaintext depending on whether encryption or decryption respectively is being performed.

The cipher support structure 29 comprises: an input buffer 34; a key schedule module 36; an IV and key buffer module 38; an XOR block 40; and five multiplexers 42, 44, 46, 48, 50. The structure and functions of these various components are described in detail below.

The incoming bit string 31 is input to the input buffer 34 and to the IV and key buffer module 38. The input buffer 34 stores a particular incoming bit string and provides this bit string 52 as an input to the cipher module 30 via one of the multiplexers 46, depending on the mode of operation which controls the multiplexer as explained later. In this example, the electronic device 28 is arranged to carry out the 3DES cipher and so the input buffer 34 stores a 64-bit bit string, i.e. one block. The connection to the IV and key buffer module 38 provides for setting the IV if the device 28 is to be operated in CBC mode, as discussed in more detail below.

The IV and key buffer module 38 also stores the encryption key for a particular invocation of the DES algorithm. This key 54 is provided to the key schedule module 36, which derives from the encryption key a set of round keys 56, where the round keys are given sequentially to the cipher module 30 for successive enciphering/deciphering rounds.

The five multiplexers 42, 44, 46, 48, 50 form a switching arrangement that can switch the device 28 between ECB and CBC modes and, when in CBC mode, between encryption and decryption modes. An ECB/CBC control signal 58 is applied to two of the multiplexers 46, 50 while a CBC encrypt/decrypt control signal 60 is applied to the other multiplexers 42, 44, 48.

In the ECB mode of operation (regardless of whether used for encryption or decryption), the ECB/CBC control signal 58 is set to '0'. This connects the input buffer 34 to the input of the cipher module 30 such that the buffered incoming bit string 52 (which may be a plaintext or a ciphertext) is provided to the input of the cipher module 30. Setting the ECB/CBC control signal 58 to '0' also connects the output of the cipher module 30 to the output of the overall device 28 such that the output of the cipher module 30 is provided as the outgoing bit string 32.

Figure 4:
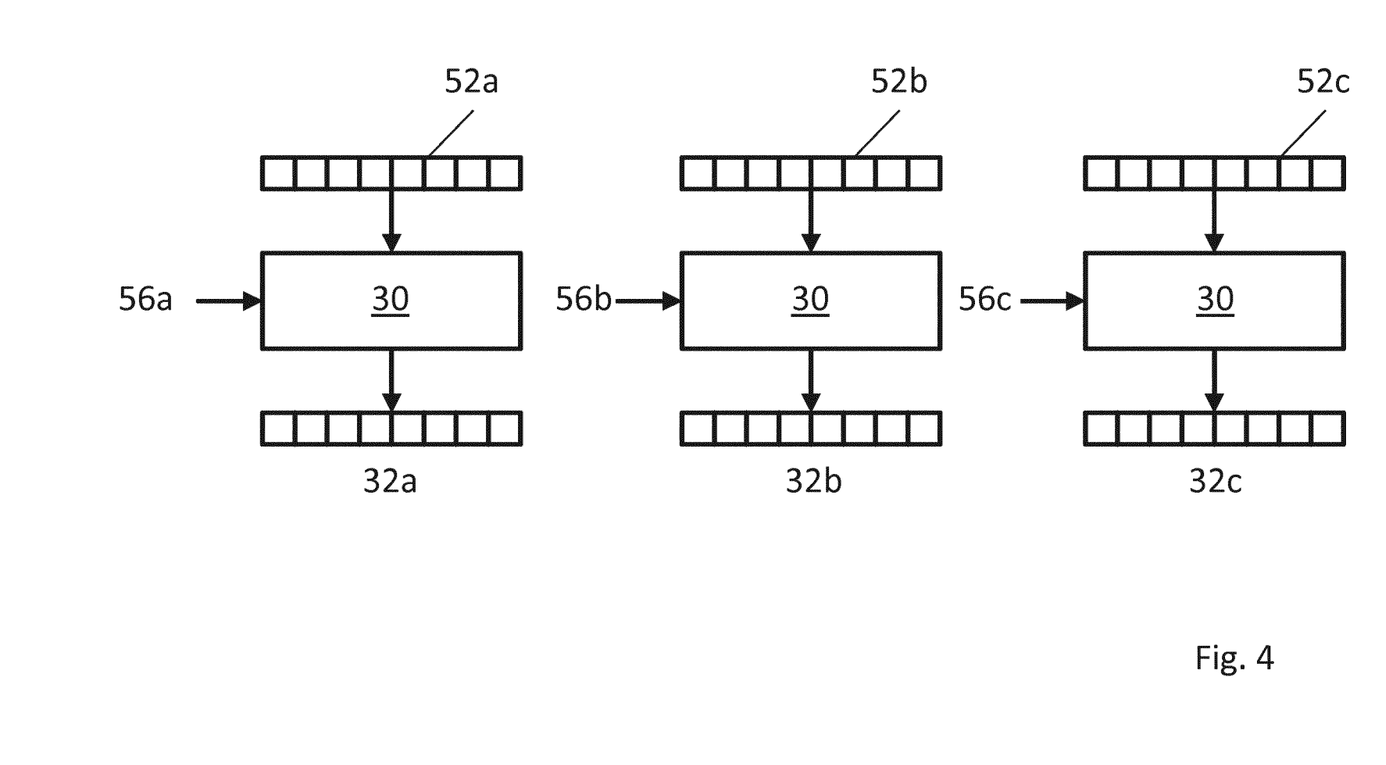
FIG. 4 is a schematic diagram of the cipher structure's ECB encryption/decryption mode of operation.

This ECB mode can be more readily understood by way of reference to FIG. 4, which is a schematic diagram of the cipher structure's ECB encryption/decryption mode of operation, where three invocations of the ECB process are shown, though it will be appreciated that more or fewer of these may take place in practice. For each invocation, the buffered incoming bit string 52*a-c* is fed to the cipher module 30, which takes a corresponding round key 56*a-c* as a further input and produces a respective outgoing bit string 32*a-c*. If the buffered incoming bit string 52*a-c* is plaintext, then the respective outgoing bit string 32*a-c* is ciphertext, and vice versa. However, there is no dependence on the other invocations when operating under the ECB mode.

Referring again to FIG. 3, in the CBC encryption mode of operation, the ECB/CBC control signal 58 is set to '1' and the CBC encrypt/decrypt control signal 60 is set to '0'. The incoming bit string 52 (which, in this case, is a plaintext) is passed to the XOR block 40 through one of the multiplexers 42. The incoming bit string 52 is then added to the contents 62 of the IV and key buffer 38 by the XOR block 40 to produce a combined bit string 64. The combined bit string 64 is provided to the input of the cipher module 30 via two further multiplexers 44, 46. The IV and key buffer 38 then updates its stored bit string to be equal to the bit string at the output of the cipher module 30. The output of the cipher module 30 is then provided as the outgoing bit string 32 at the output of the device 28.

Figure 5:
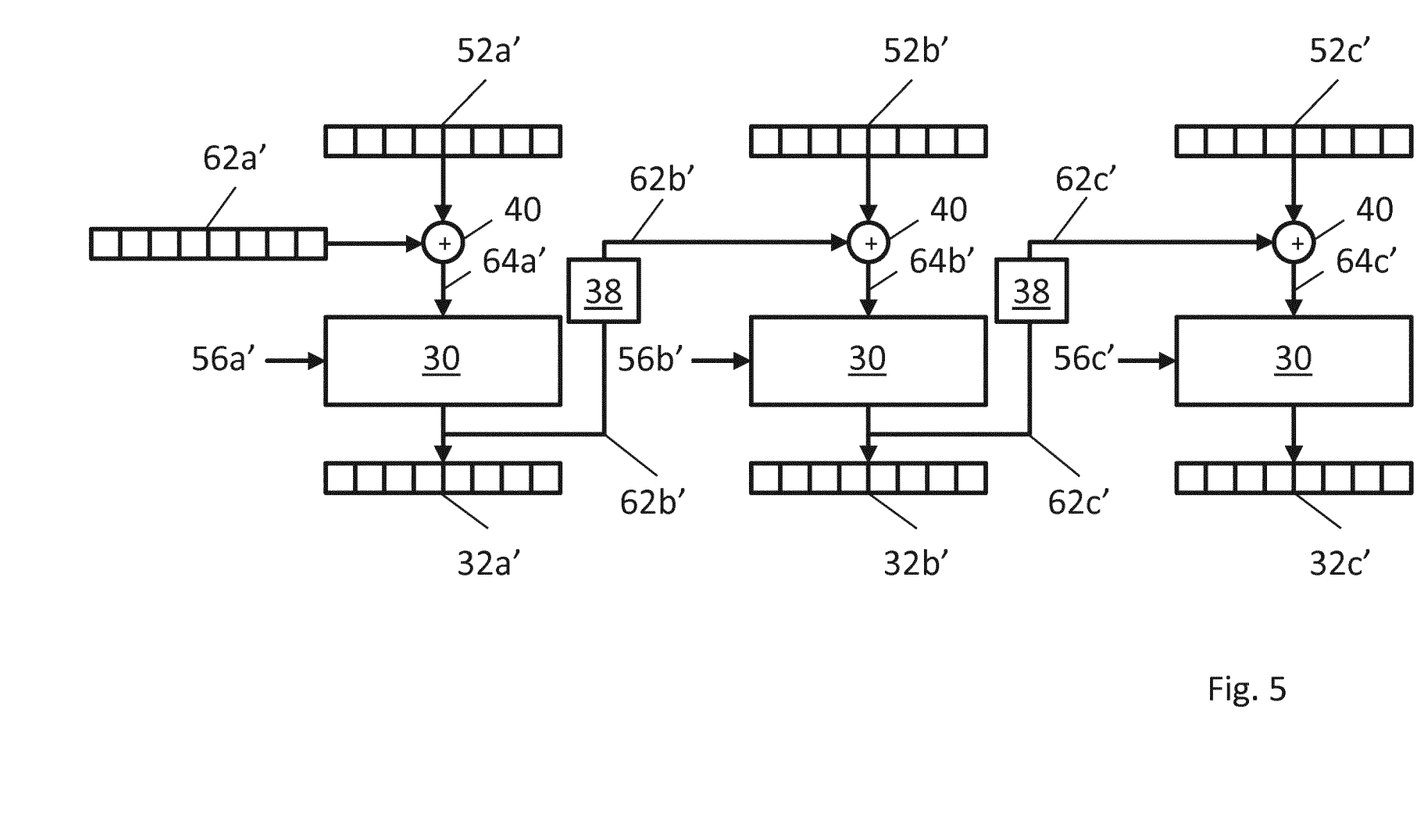
FIG. 5 is a schematic diagram of the cipher structure's CBC encryption mode of operation.

This CBC encryption mode can be more readily understood by way of reference to FIG. 5, which is a schematic diagram of the cipher structure's CBC encryption mode of operation. Three sequential invocations of the CBC encryption are shown in the Figure, though it will be appreciated that more or fewer of these may take place in practice.

In the first invocation, the buffered incoming bit string 52$a'$ is added to an IV 62$a'$ which is stored in the IV and key buffer module 38 (which, in turn, may be loaded via the input 31 prior to beginning the ciphering process) by the XOR block 40, resulting in a combined bit string 64$a'$. This combined bit string 64$a'$ is then provided to the input of the cipher module 30 together with the first round key 56$a'$, which enciphers the combined bit string 64$a'$ (using the first round key 56$a'$) to produce the outgoing bit string 32$a'$. The outgoing bit string 32$a'$ is input to the IV and key buffer 38, which stores it for the next invocation (either by overwriting the IV 62$a'$ or by appending it to a stored list).

The next invocation repeats the above process in a similar way, except the buffered incoming bit string 52$b'$ is added by the XOR block 40 to the stored bit string 62$b'$ from the previous invocation in order to produce the combined bit string 64$b'$ that is input to the cipher module 30. The resulting outgoing bit string 32$b'$ is then stored in the IV and key buffer 38 as a stored bit string 62$c'$. The cipher module produces the next outgoing bit string 32$c'$. This process continues in a chain for as long as required.

In the final invocation, the stored bit string 62$c'$ is fed to the input of the XOR block 40 together with the next buffered incoming bit string 52$c'$ to produce another combined bit string 64$c'$, which is input to the cipher module 30 with a further round key 56$c'$.

Returning to FIG. 3, in the CBC decryption mode of operation, the ECB/CBC control signal 58 is set to '1' and the CBC encrypt/decrypt control signal 60 is set to '1'. The buffered incoming bit string 52 (which, in this case, is a ciphertext) is provided to the input of the cipher module 30 via two multiplexers 44, 46. The output from the cipher module 30 is input to the XOR block 40 together with the contents of the IV and key buffer 38, and the resulting combined bit string 64 is provided as the output 32 of the device 28.

When in the CBC decryption mode, the IV and key buffer 38 is initially provided with an IV for the first round, but the contents of the IV and key buffer 38 is updated such that the next round makes use of the ciphertext (i.e. the incoming bit string) of the current round.

The incoming bit string 52 is then added to the contents 62 of the IV and key buffer 38 by the XOR block 40 to produce a combined bit string 64. The combined bit string 64 is provided to the input of the cipher module 30 via two further multiplexers 44, 46. The IV and key buffer 38 then updates its stored bit string to be equal to the bit string at the output of the cipher module 30. The output of the cipher module 30 is then provided as the outgoing bit string 32 at the output of the device 28.

Figure 6:
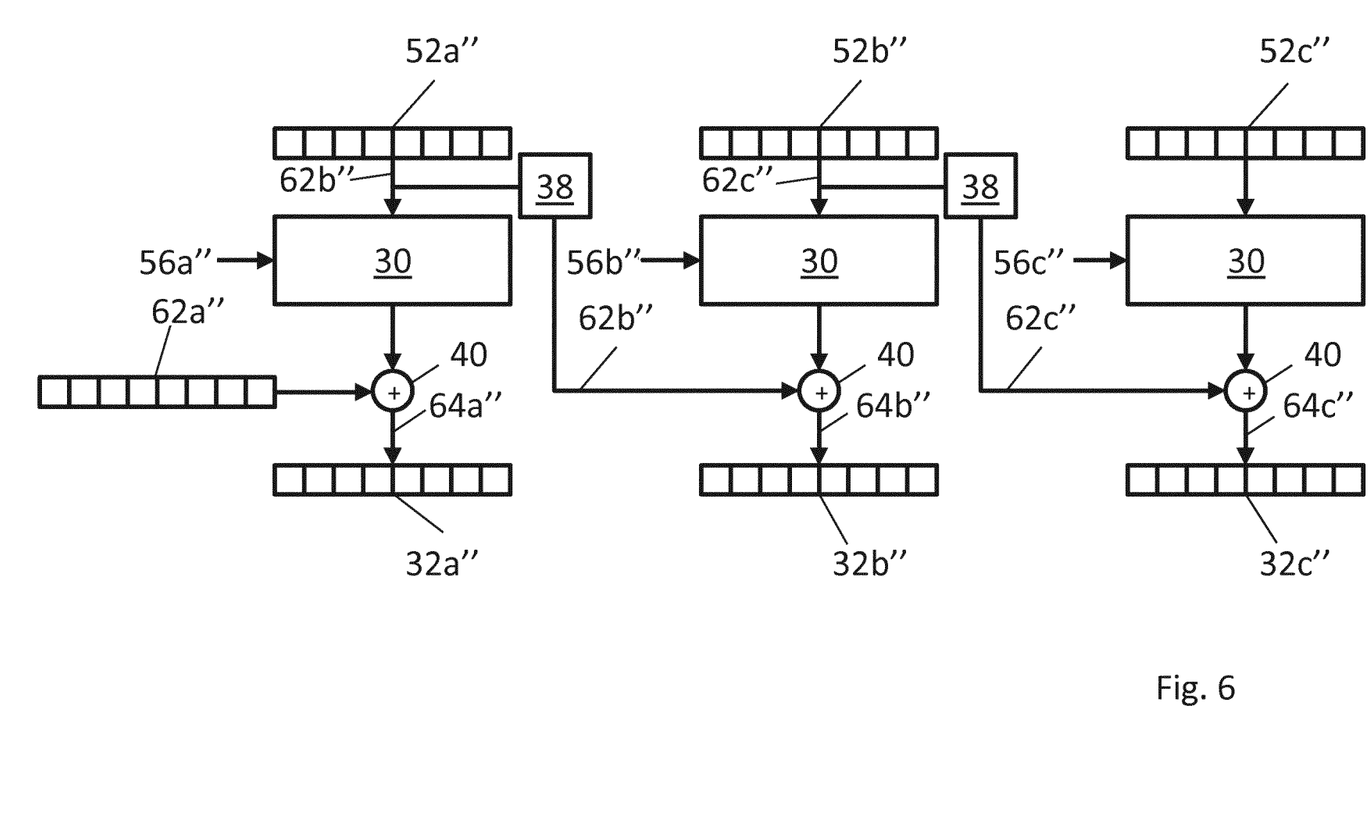
FIG. 6 is a schematic diagram of the cipher structure's CBC decryption mode of operation.

This CBC decryption mode can be more readily understood by way of reference to FIG. 6, which is a schematic diagram of the cipher structure's CBC decryption mode of operation. Three sequential invocations of the CBC decryption are shown in the Figure, though it will be appreciated that more or fewer of these may take place in practice.

In the first invocation, the buffered incoming bit string 52$a''$ is input to the cipher module 30, which also takes a round key 56$a''$ and deciphers the buffered incoming bit string 52$a''$. The output of the cipher module 30 is then added by the XOR block 40 to an IV 62$a''$, which is stored in the IV and key buffer 38, to produce a combined bit string 64$a''$. This combined bit string 64$a''$ is then taken as the outgoing bit string 32$a''$. The buffered incoming bit string 52$a''$ is input to the IV and key buffer 38 for use in the next invocation.

In the next invocation, the buffered incoming bit string 52$b''$ is input to the cipher module 30, which takes the next round key 56$b''$ and deciphers the buffered incoming bit string 52$b''$. The result of this deciphering process is then added by the XOR block 40 to the buffered incoming bit string 62$b''$ from the previous invocation (stored in the IV and key buffer 38) to produce a further combined bit string 64$b''$. This combined bit string 64$b''$ is then taken as the outgoing bit string 32$b''$. The buffered incoming bit string 52$b''$ is also input to the IV and key buffer 38 for use in the next invocation.

This chain continues to the next invocation, in which the buffered incoming bit string 52$c''$ is input to the cipher module 30, which takes the next round key 56$c''$ and deciphers the buffered incoming bit string 52$c''$. The result of this deciphering process is then added by the XOR block 40 to the buffered incoming bit string 62$c''$ from the previous invocation (stored in the IV and key buffer 38) to produce a further combined bit string 64$c''$. This combined bit string 64$c''$ is then taken as the outgoing bit string 32$c''$. As before, the buffered incoming bit string 52$c''$ is also input to the IV and key buffer 38 for use in a subsequent invocation (not shown).

Figure 7:
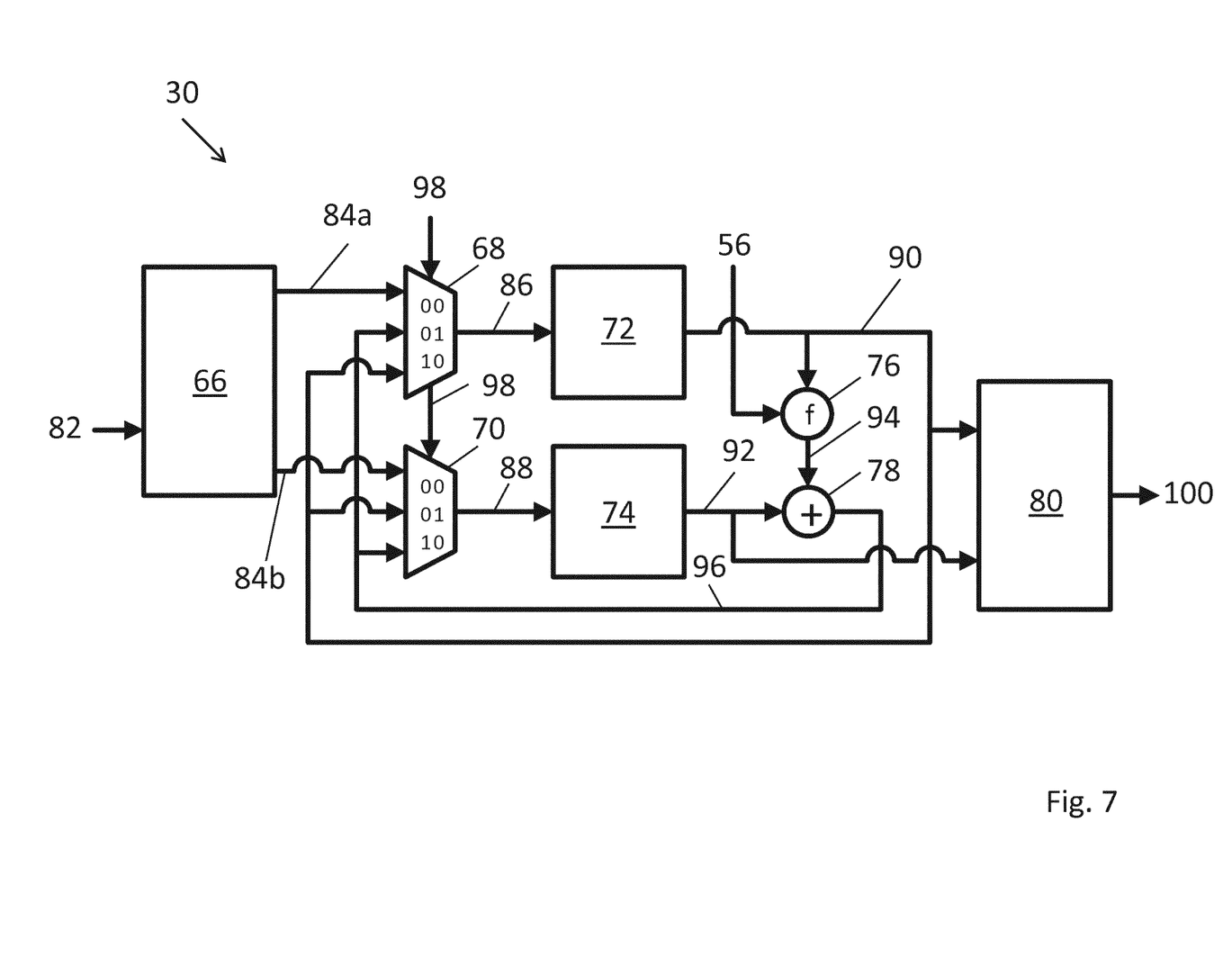
FIG. 7 is a schematic diagram of the hardware acceleration module used in the electronic device of FIG. 3.

FIG. 7 is a schematic diagram of the hardware acceleration module 30 of FIG. 3. The hardware acceleration module comprises: an initial permutation block 66; two three-to-one multiplexers 68, 70; two 32-bit registers 72, 74; a calculation block 76; an addition block 78; and a final permutation block 80. The structure and function of each of these elements are explained in turn below.

The initial permutation block 66 is arranged to receive an incoming bit string 82 which, depending on the mode being used, will typically be either the buffered incoming bit string 52 (for ECB mode and for CBC encryption mode) or the combined bit string 64 (for CBC decryption mode) described above with respect to FIG. 3. This block 66 performs an initial permutation function, known in the art per se but reproduced here for reference) in which the order of the bits is arranged in accordance with Table 1 below:

TABLE 1

| Initial Permutation function | | | | | | | |
|---|---|---|---|---|---|---|---|
| 58 | 50 | 42 | 34 | 26 | 18 | 10 | 2 |
| 60 | 52 | 44 | 36 | 28 | 20 | 12 | 4 |
| 62 | 54 | 46 | 38 | 30 | 22 | 14 | 6 |
| 64 | 56 | 48 | 40 | 32 | 24 | 16 | 8 |
| 57 | 49 | 41 | 33 | 25 | 17 | 9 | 1 |
| 59 | 51 | 43 | 35 | 27 | 19 | 11 | 3 |
| 61 | 53 | 45 | 37 | 29 | 21 | 13 | 5 |
| 63 | 55 | 47 | 39 | 31 | 23 | 15 | 7 | where this table should be read from left-to-right, top-to-bottom (i.e. in practice it is a 64-bit vector, not an 8-by-8 array but is presented in this form for ease of reference). The permuted bit string is taken from this block 66 as two separate sub-blocks 84a, 84b, i.e. the permuted bit string is divided into two halves as described below.

It will be understood that the numbers in Table 1 represent from which bit position in the incoming bit string 82 the bit position in the permuted bit string 84a, 84b corresponding to the position in Table 1 should take its data. For example, the $1^{st}$ bit of the permuted bit string 84a, 84b produced by the initial permutation block 66 should contain the value of the $58^{th}$ bit position within the incoming bit string 82 and the $10^{th}$ bit of permuted bit string 84a, 84b produced by the initial permutation block 66 should contain the value of the $52^{nd}$ bit position within the incoming bit string 82.

These two permuted sub-blocks 84a, 84b are input to the multiplexers 68, 70 at their '00' input, as described in further detail below. These multiplexers 68, 70 each provide a respective output bit string 86, 88 to the 'right-hand' register 72 (which forms a first memory area) and 'left-hand' register 74 (which forms a second memory area).

The output bit string 90 from the right-hand register 72 is input to the calculation block 76, to the '10' input of the first multiplexer 68 (i.e. the multiplexer 68 that feeds the right-hand register 72), to the '01' input of the second multiplexer 70 (i.e. the multiplexer 70 that feeds the left-hand register 74), and to the final permutation block 80.

The output bit string 92 from the left-hand register 74 is input to the addition block 78, and to the final permutation block 80.

The calculation block 76 performs the Feistel function described above with respect to FIG. 2, in which the bit string 90 from the right-hand register 72 is used as the 32-bit input 8a-d to the expansion block 20 and the round key 56 is used as the round key 18a-d input to the XOR block 22. The output bit string 94 from the calculation block 76 (i.e. the output 9a-d shown in FIG. 2) is provided as a further input to the addition block 78, which performs a bit-wise XOR operation on the output bit string 94 from the calculation block 76 and the output bit string 92 from the left-hand register to produce a resultant bit string 96.

This resultant bit string 96 is fed back to the '01' input of the first multiplexer 68 and to the '10' input of the second multiplexer 70.

The two multiplexers 68, 70 take a control signal 98 as an input, where this control signal 98 takes one of the binary values 0b00, 0b01, or 0b10 (where the prefix '0b' indicates that a binary number follows the prefix). The two multiplexers 68, 70 form a controller, the operation of which is described below.

In order to carry out 3DES (i.e. with three different 3DES encryption keys), if the hardware accelerator 30 is being used within the device 28 that includes the cipher support structure 29 described above with reference to FIG. 3, the control signals 58, 60 must be set accordingly. If using ECB, the ECB/CBC control signal 58 should be set to '0' for all three 3DES keys. If using CBC, the ECB/CBC control signal 58 should be set to '1' for all three 3DES keys, and the CBC encrypt/decrypt control signal 60 should be set to '0' for the first and third 3DES keys but to the CBC encrypt/decrypt control signal 60 should be set to '1' for the second 3DES key. It will be appreciated however, that this hardware accelerator 30 may be used in different devices and structures that are not exactly the same as the device 28 of FIG. 3.

When carrying out 3DES, the control signal 98 is first set to 0b00, the first multiplexer 68 provides the right-hand portion of the permuted bit string 84a (i.e. one half of the output of the initial permutation block 66) to the right-hand register 72, i.e. the output bit string 86 of the first multiplexer 68 is set to the right-hand portion of the permuted bit string 84a. The second multiplexer 70 provides the left-hand portion of the permuted bit string 84b (i.e. the other half of the output of the initial permutation block 66) to the left-hand register 74, i.e. the output bit string 88 of the second multiplexer 70 is set to the left-hand portion of the permuted bit string 84b. The outputs 90, 92 of the registers 72, 74 are then processed using the Feistel function for the first round as described above, where this round uses a first round key 56 derived from the first encryption key.

The control signal 98 is then set to 0b01 for the next fourteen rounds of the first invocation of the DES algorithm. At each round, the first multiplexer 68 provides the resultant bit string 96 produced by the addition block to the right-hand register 72. The second multiplexer 70 provides the output bit string 90 from the right-hand register 72 (i.e. the value in the right-hand register 72 from the previous round) to the left-hand register 74, thus providing the 'criss-cross' described previously. The outputs 90, 92 of the registers 72, 74 are then processed using the Feistel function for these fourteen rounds as described above, where this round uses the next fourteen round keys 56 derived from the first encryption key.

Finally, the control signal 98 is set to 0b10 for the final round of the first invocation of the DES algorithm. During this round, the first multiplexer 68 loops the contents of the right-hand register 72 back on itself while the second multiplexer 70 provides the resultant bit string 96 from the addition block 78 to the left-hand register 74, i.e. no 'criss-cross' takes place for the last round. The outputs 90, 92 of the registers 72, 74 are then processed using the Feistel function for the final round as described above, where this round uses the final round key 56 derived from the first encryption key.

For the second and third encryption keys, there is no need to set the control signal to 0b00 because the data the cipher is to operate on is already in the registers 72, 74 from the end of the previous invocation of the DES algorithm. Instead, the control signal 98 is set to 0b01 for the first fifteen rounds of each of the second and third invocations of the DES algorithm. At each round, the first multiplexer 68 provides the resultant bit string 96 produced by the addition block to the right-hand register 72. The second multiplexer 70 provides the output bit string 90 from the right-hand register 72 (i.e. the value in the right-hand register 72 from the previous round) to the left-hand register 74, thus providing the 'criss-cross' described previously. The outputs 90, 92 of the registers 72, 74 are then processed using the Feistel function for these fifteen rounds as described above, where this round uses the first fifteen round keys 56 derived from each of the second and third encryption keys as appropriate.

For the sixteenth and final round of each of the second and third invocations of the DES algorithm, the control signal 98 is set to 0b10. As outlined previously, during this round, the first multiplexer 68 loops the contents of the right-hand register 72 back on itself while the second multiplexer 70 provides the resultant bit string 96 from the addition block 78 to the left-hand register 74, i.e. no 'criss-cross' takes place for the last round. The outputs 90, 92 of the registers 72, 74 are then processed using the Feistel function for the final round as described above, where this round uses the final round keys 56 derived from the second and third encryption keys as appropriate.

After all three DES invocations are complete, the final permutation block 80 performs a final permutation function, known in the art per se but reproduced here for reference) which is the inverse of the initial permutation function described above with reference to Table 1. During this final permutation function, the order of the bits is arranged in accordance with Table 2 below:

TABLE 2

| Final Permutation function | | | | | | | |
|---|---|---|---|---|---|---|---|
| 40 | 8 | 48 | 16 | 56 | 24 | 64 | 32 |
| 39 | 7 | 47 | 15 | 55 | 23 | 63 | 31 |
| 38 | 6 | 46 | 14 | 54 | 22 | 62 | 30 |
| 37 | 5 | 45 | 13 | 53 | 21 | 61 | 29 |
| 36 | 4 | 44 | 12 | 52 | 20 | 60 | 28 |
| 35 | 3 | 43 | 11 | 51 | 19 | 59 | 27 |
| 34 | 2 | 42 | 10 | 50 | 18 | 58 | 26 |
| 33 | 1 | 41 | 9 | 49 | 17 | 57 | 25 | where this table should be read from left-to-right, top-to-bottom (i.e. in practice it is a 64-bit vector, not an 8-by-8 array but is presented in this form for ease of reference). The input bit string to this block 80 is provided as two separate sub-blocks 90, 92, i.e. the outputs of the right-hand and left-hand registers 72, 74. The output of this final permutation block 80 is provided as an output bit string 100, which is either a plaintext or a ciphertext depending on whether the initial input 82 was a ciphertext or a plaintext respectively.

Figure 8:
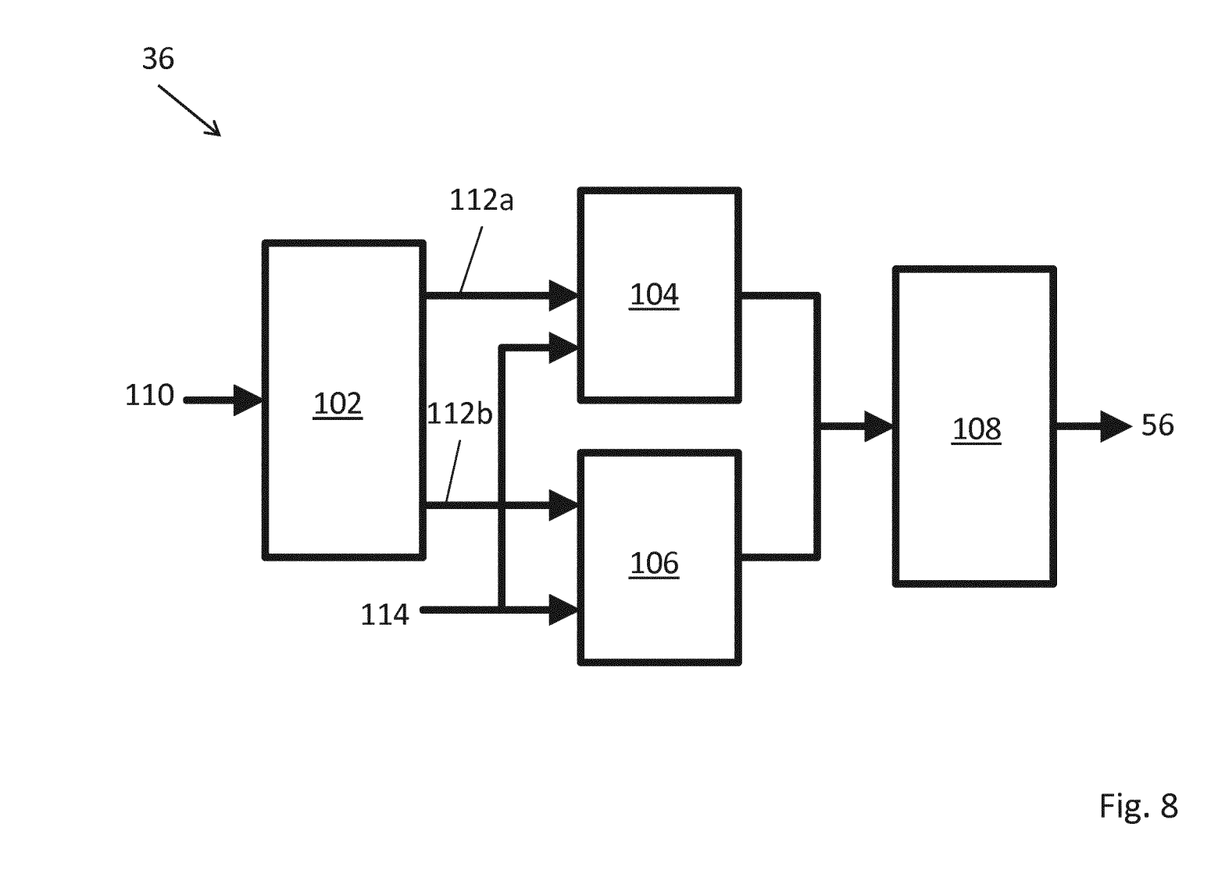
FIG. 8 is a schematic diagram of the key schedule module used in the cipher structure of FIG. 3.

FIG. 8 is a schematic diagram of the key schedule module 36 used in the cipher structure of FIG. 3. The key schedule module 36 comprises: a first permuted choice block 102; two shift registers 104, 106; and a second permuted choice block 108.

The first permuted choice block 102 is arranged to receive a 56-bit DES key 110 and divides the 56 bits into two 28-bit half-keys 112*a*, 112*b*. These half-keys 112*a*, 112*b* are input to the first and second shift registers 104, 106 respectively, which also take a shift control signal 114 as an input. This shift control signal 114 causes the contents of the first and second shift registers 104, 106 to undergo a cyclic logical shift of one or two places (with the direction depending on whether encryption or decryption is being used), where the number of positions shifted (i.e. whether it is one or two) depends on the current round number. Those skilled in the art will appreciate that 'cyclic logical shift' means that the data in the leftmost bit position moves to the rightmost bit position when data is shifted left beyond the end of the register. Similarly, the data in the rightmost bit position moves to the leftmost bit position when data is shifted right beyond the end of the register The second permuted choice block 108 then uses a particular selection pattern to choose a 48-bit selection from the 56-bits stored across the two shift registers 104, 106, where it selects twenty-four bits from the first shift register 104 and twenty-four bits from the second shift register 106. These forty-eight bits then make up the 48-bit round key 56 used by cipher operations as outlined above. The rotations performed by the shift registers 104, 106 in response to the shift control signal 114 have the effect that different bits are used for each round key.

Thus it will be appreciated by those skilled in the art that embodiments of the present invention provide a hardware accelerator for performing ciphering and/or deciphering operations and an associated cipher support structure for switching a block cipher between ECB and CBC modes of operation. The hardware accelerator performs data handling operations internally, i.e. independently from software, which reduces the execution time of the cipher algorithm, thereby increasing the speed of the encryption algorithm. Similarly, the cipher support structure allows for data to be routed to and from a block cipher correctly for ECB and CBC modes of operation. Those skilled in the art will appreciate that the specific embodiments described herein are merely exemplary and that many variants within the scope of the invention are envisaged.

The invention claimed is:

1. A hardware accelerator for performing cipher operations to convert between a plaintext message and a ciphertext message, the hardware accelerator comprising:
   a first memory area arranged to store a first bit string provided at an input thereto;
   a second memory area arranged to store a second bit string provided at an input thereto;
   a calculation block arranged to receive a round key and to perform a function on the first bit string, wherein the function comprises combining the first bit string with the round key to produce a combined bit string, and performing a non-linear mapping from the combined bit string to a mapped bit string;
   an addition block arranged to add the mapped bit string to the second bit string to produce a resultant bit string; and
   a controller arranged to receive a control signal, wherein the controller is further arranged such that:
   when the control signal is in a first state, the controller provides the resultant bit string to the input of the first memory area and provides the first bit string to the input of the second memory area; and
   when the control signal is in a second state, the controller provides the first bit string to the input of the first memory area and provides the resultant bit string to the input of the second memory area.

2. The hardware accelerator as claimed in claim 1, wherein the function carried out by the calculation block comprises a Feistel function.

3. The hardware accelerator as claimed in claim 1, further comprising an initial permutation block arranged to perform an initial permutation operation on an input bit string and to generate therefrom first and second initial bit strings, wherein the controller is further arranged such that when the control signal is in a third state, the controller provides the first initial bit string to the input of the first memory area and provides the second initial bit string to the input of the second memory area.

4. The hardware accelerator as claimed in claim 3, further comprising a final permutation block arranged to perform an inverse of the initial permutation operation.

5. The hardware accelerator as claimed in claim 1, wherein the controller comprises a first multiplexer and a second multiplexer each comprising a respective first data input, second data input, control input, and data output, said controller being arranged such that:
   the first data input of the first multiplexer and the second data input of the second multiplexer are each connected to an output of the addition block;
   the second data input of the first multiplexer and the first data input of the second multiplexer are each connected to an output of the first memory area;

the data output of the first multiplexer is connected to the input of the first memory area, and the data output of the second multiplexer is connected to the input of the second memory area; and the respective control inputs of the first and second multiplexers are each arranged to receive the control signal;

wherein each of the first and second multiplexers is arranged to route its respective first data input to its respective data output when the control signal is in the first state; and wherein each of the first and second multiplexers is arranged to route its respective wherein each of the first and second multiplexers is arranged to route its respective second data input to its respective data output when the control signal is in the second state.

6. The hardware accelerator as claimed in claim 5, further comprising a final permutation block arranged to perform an inverse of the initial permutation operation, wherein each of the first and second multiplexers comprises a respective third data input connected to the initial permutation block, wherein:

the third data input of the first multiplexer is arranged to receive the first initial bit string from the initial permutation block;

the third data input of the second multiplexer is arranged to receive the second initial bit string from the initial permutation block; and each of the first and second multiplexers is arranged to route its respective third data input to its respective data output when the control signal is in the third state.

7. The hardware accelerator as claimed in claim 1, arranged to:

a) divide the plaintext message into first and second sub-blocks;

b) provide the first and second sub-blocks as the first and second bit strings respectively;

c) set the control signal to the first state for a predetermined number of cycles, wherein a new round key, derived from an encryption key, is supplied for each cycle;

d) supply a further new round key, derived from the encryption key, and setting the control signal to the second state after the predetermined number of cycles have been carried out; and repeat steps c) and d) for a plurality of encryption keys.

8. A method of operating a hardware accelerator for performing cipher operations to convert between a plaintext message and a ciphertext message, the hardware accelerator comprising first and second memory areas, wherein the method comprises:

storing a first bit string in the first memory area, wherein the first bit string is provided at an input to said first memory area;

storing a second bit string in the second memory area, wherein the second bit string is provided at an input to said second memory area;

receiving a round key;

performing a function on the first bit string, wherein the function comprises combining the first bit string with the round key to produce a combined bit string, and performing a non-linear mapping from the combined bit string to a mapped bit string;

adding the mapped bit string to the second bit string to produce a resultant bit string; and receiving a control signal;

when the control signal is in a first state, providing the resultant bit string to the input of the first memory area and providing the first bit string to the input of the second memory area; and when the control signal is in a second state, providing the first bit string to the input of the first memory area and providing the resultant bit string to the input of the second memory area.

9. The method as claimed in claim 8, wherein the function comprises a Feistel function.

10. The method as claimed in claim 8, further comprising:

a) dividing the plaintext message into first and second sub-blocks;

b) providing the first and second sub-blocks as the first and second bit strings respectively;

c) setting the control signal to the first state for a predetermined number of cycles, wherein a new round key, derived from an encryption key, is supplied for each cycle;

d) supplying a further new round key, derived from the encryption key, and setting the control signal to the second state after the predetermined number of cycles have been carried out; and repeating steps c) and d) for a plurality of encryption keys.

11. The method as claimed in claim 10, further comprising:

performing an initial permutation operation on an input bit string and generating therefrom first and second initial bit strings;

when the control signal is in a third state, providing the first initial bit string to the input of the first memory area and providing the second initial bit string to the input of the second memory area; and setting the control signal to the third state before carrying out step c).

12. The method as claimed in claim 11, comprising setting the control signal to the third state only before a first repetition of step c).

13. The method as claimed in claim 11, further comprising performing an inverse of the initial permutation after step d).

14. The method as claimed in claim 13, further comprising performing the inverse of the initial permutation only after a final repetition of step d).

* * * * *

UNITED STATES PATENT AND TRADEMARK OFFICE
CERTIFICATE OF CORRECTION

PATENT NO. : 11,770,237 B2  
APPLICATION NO. : 17/251495  
DATED : September 26, 2023  
INVENTOR(S) : Matti Tiikkainen Page 1 of 1

It is certified that error appears in the above-identified patent and that said Letters Patent is hereby corrected as shown below:

In the Claims

<u>Column 17,</u>  
Lines 13-15, "its respective wherein each of the first and second multiplexers is arranged to route its respective second" should read --its respective second--

Signed and Sealed this  
Twenty-first Day of January, 2025

Coke Morgan Stewart  
*Acting Director of the United States Patent and Trademark Office*